United States Patent
Durham et al.

(10) Patent No.: US 9,917,459 B2
(45) Date of Patent: Mar. 13, 2018

(54) CROSS BODY CHARGING FOR WEARABLE DEVICES

(71) Applicant: Intel Corporation, Santa Clara, CA (US)

(72) Inventors: Lenitra M. Durham, Beaverton, OR (US); Glen J. Anderson, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 503 days.

(21) Appl. No.: 14/582,010

(22) Filed: Dec. 23, 2014

(65) Prior Publication Data

US 2016/0181823 A1 Jun. 23, 2016

(51) Int. Cl.
| | | |
|---|---|---|
| H01F 38/00 | (2006.01) | |
| H02J 7/00 | (2006.01) | |
| G06F 1/16 | (2006.01) | |
| H04B 1/3827 | (2015.01) | |

(52) U.S. Cl.
CPC ............ H02J 7/0054 (2013.01); G06F 1/163 (2013.01); *H02J 2007/006* (2013.01); *H02J 2007/0062* (2013.01); *H02J 2007/0096* (2013.01); *H04B 1/385* (2013.01)

(58) Field of Classification Search
CPC .......................... H02J 7/0054; H02J 2007/006
USPC ........................................................ 307/104
See application file for complete search history.

(56) References Cited

U.S. PATENT DOCUMENTS

| | | | |
|---|---|---|---|
| 9,210,498 B1 * | 12/2015 | Shaffer | ................ H04R 1/1016 |
| 2008/0183388 A1 | 7/2008 | Goodrich | |
| 2011/0278943 A1 | 11/2011 | Eckhoff et al. | |
| 2014/0015470 A1 | 1/2014 | Lim et al. | |
| 2014/0120983 A1 | 5/2014 | Lam | |
| 2014/0285134 A1 | 9/2014 | Kim et al. | |
| 2015/0364938 A1 * | 12/2015 | Lapetina | ................ H01F 38/14 |
| | | | 320/114 |

OTHER PUBLICATIONS

Patel, Imran, "Ceramic Based Intelligent Piezoelectric Energy Harvesting Device", <www.intechopen.com>, British University in Egypt, Suez Desert Road, El Sherouk City, The University of Bolton, Bolton, Egypt, Sep. 6, 2011, 23 pages.

International Search Report and Written Opinion received for PCT Patent Application No. PCT/US2015/064024, dated Apr. 12, 2016, 12 pages.

* cited by examiner

*Primary Examiner* — Alfonso Perez Borroto

(57) ABSTRACT

Techniques to transmit power across a wearable device are provided. A wearable device can include a conductive transmission line and a set of contacts, the set of contacts configured to be releasably connected to a second set of contacts on another wearable device. As such, power can be communicated to the conductive transmission line through the sets of contacts and transmitted across the wearable device, via the conductive transmission line.

24 Claims, 11 Drawing Sheets

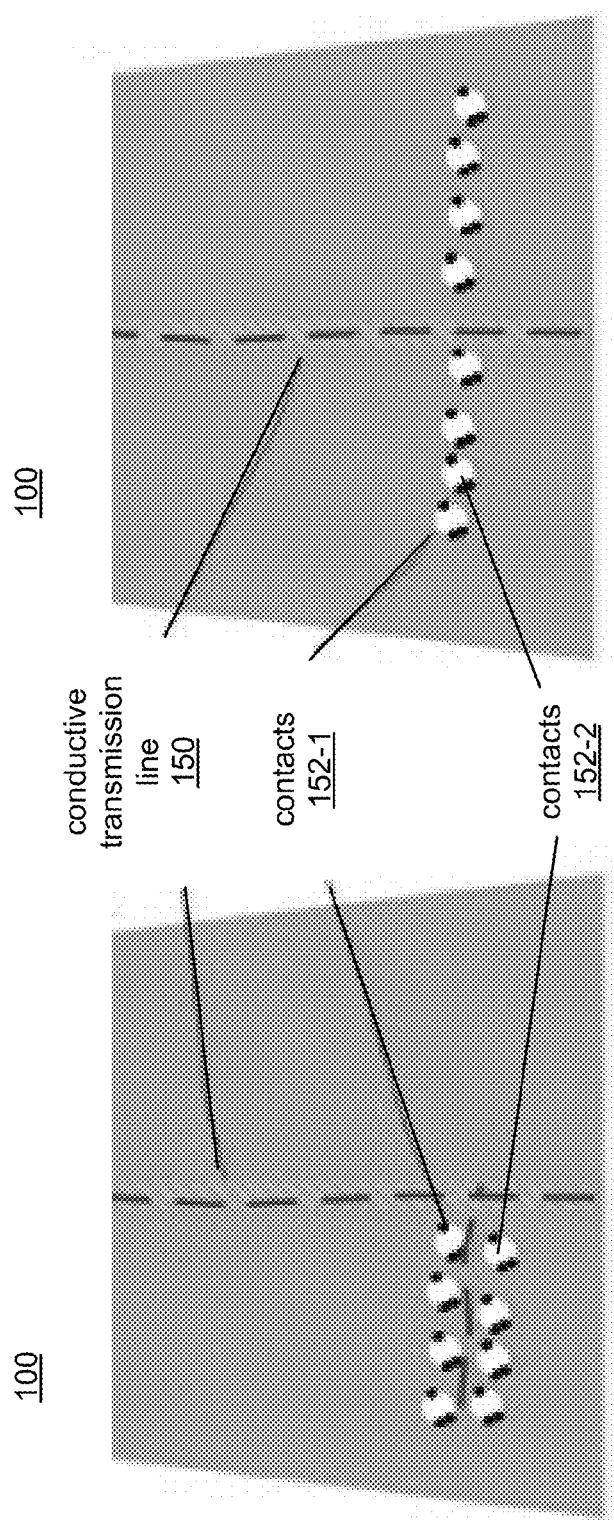

CROSS BODY CHARGING FOR WEARABLE DEVICES

BACKGROUND

Modern clothing and other wearable accessories may incorporate computing or other advanced electronic technologies. Such computing and/or advanced electronic technologies may be incorporated for various functional reasons or may be incorporated for purely aesthetic reasons. Such clothing and other wearable accessories are generally referred to as "wearable technology" or "wearable computing devices."

Some wearable devices can include the ability to generate power. However, transmitting such power to other locations or other devices is difficult. The present disclosure is directed to the above.

BRIEF DESCRIPTION OF THE DRAWINGS

FIGS. 4A-4B, 5A-5B, 6A-6B, and 7-8 illustrate examples of various wearable devices of the system of FIG. 1.

DETAILED DESCRIPTION

Figure 1:
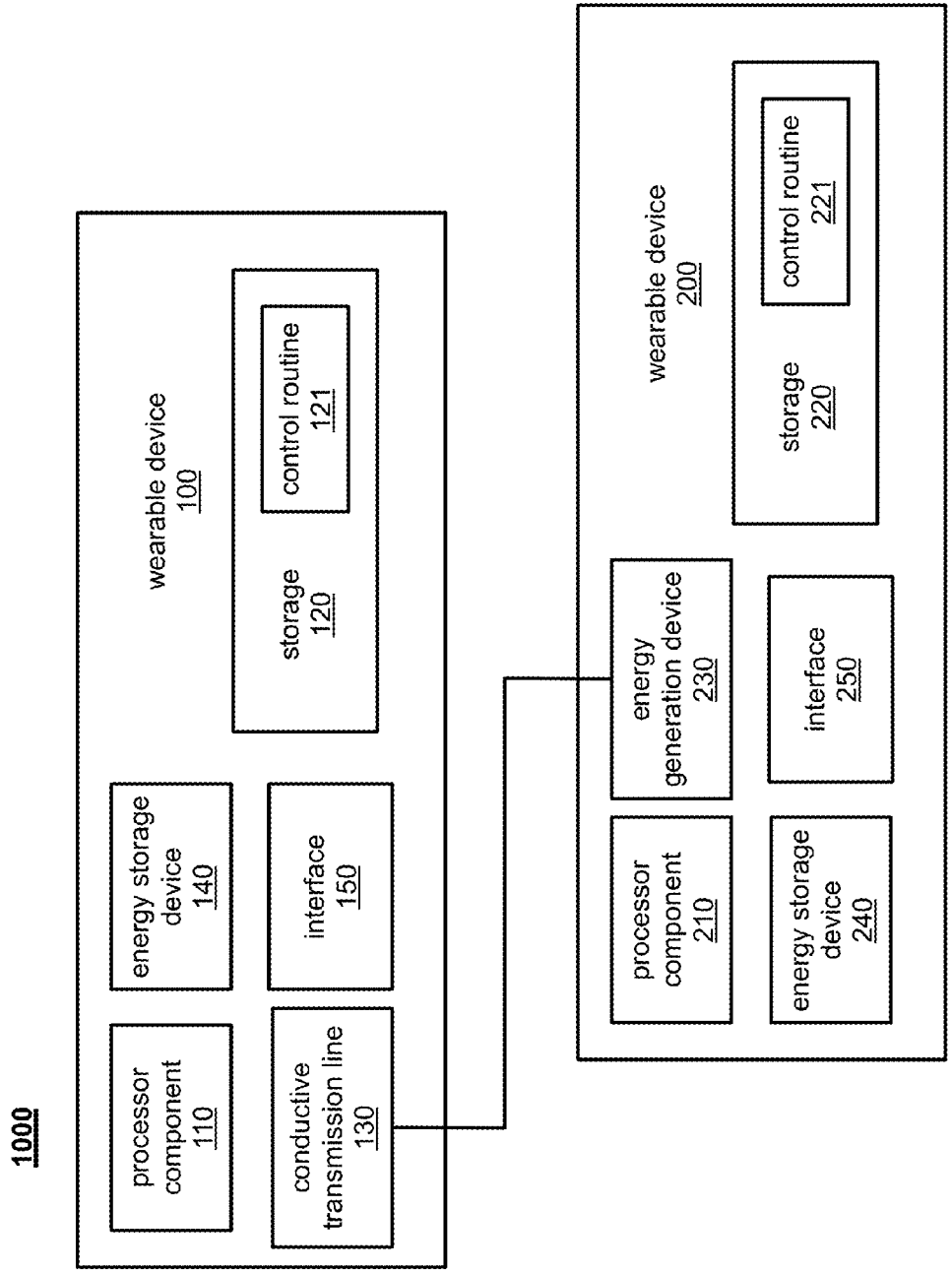
FIG. 1 is a block diagram illustrating a wearable device configured to communicate power across the wearable device according to at least one embodiment of the present disclosure.

Various embodiments are generally directed to a system for transmitting power between wearable devices or between a wearable device and another computing device. More specifically, the present disclosure provides that power generated at a first wearable device (e.g., a shoe, a hat, a jacket, or the like) can be transmitted to another wearable device, which may be located, for example, across a wearer's body. Said differently, the present disclosure provides a wearable device configured to transmit power across the wearable device, such as, for example between two other wearable devices.

With some examples, a first wearable device can be provided with a set of contacts configured to couple to a second wearable device, the second wearable device can include an energy generation component. The first wearable device can also include a conductive transmission line in electrical communication with the set of contacts. Accordingly, during operation, the conductive transmission line can transmit power from the energy generation component in the second wearable device across the first wearable device, such as, for example to another wearable device or to another computing device.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a system 1000 for transmitting power from a wearable device across another wearable device. In particular, the system 1000 is configured to transmit power from the wearable device 200 across the wearable device 100. In particular, the wearable device 100 includes an electrical transmission line configured to transmit power from a first point on the wearable device 100 to a second point on the wearable device 200.

In various embodiments, the wearable device 100 incorporates one or more of a processor component 110, storage 120, a conductive transmission line 130. Additionally, the wearable computing device 100 can include an energy storage device 140 and an interface 150. The storage 120 stores a control routine 121. It is important to note, that with some examples, the wearable computing device 100 may be provided with at least the conductive transmission line 130 (refer to FIG. 3). As such, the wearable computing device 100 may facilitate the transmission of power across the device (e.g., across a users body, or the like) without requiring its own power source or requiring power from another source to operate.

In various embodiments, the wearable device 200 incorporates one or more of a processor component 210, storage 220, an energy generation device 230, an energy storage device 240, and an interface 250. The storage 220 stores a control routine 121.

In general, the wearable device 100 is configured to transmit power generated from the energy generation device 230 through the conductive transmission line 130, thereby transmitting energy across the wearable device 100. Furthermore, the wearable device 100 may be configured to provide feedback (e.g., directed to a user, or the like) including an indication of whether energy is being transmitted across the wearable device 100. Furthermore, the wearable device 100 may be configured to manage the transmission of power across the wearable device 100 to, for example, one or more other wearable devices (refer to FIG. 3). It is to be appreciated, that although the present disclosure describes the wearable device 100 as (1) providing feedback and/or (2) managing the transmission of power, the wearable device 200 may be implemented to perform such operations. Examples are not limited in this context.

In various embodiments, the processor component 110 and/or the processor components 210 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the storage 120 and/or 220 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the conductive transmission line 130 can include any of a variety of conductive materials configured to provide electrical communication between two points. With some examples, the conductive transmission line can include conductive wire, conductive ribbon, conductive thread, conductive paint, or the like.

In various embodiments, the energy generation device 230 can include any of a variety of devices to generate energy or "harvest" energy. For example, in some embodiments, the energy generation device 230 can include kinetic energy capture devices, piezoelectric energy capture devices, solar cells, or the like.

In various embodiments, the energy storage devices 140 and/or 240 can include any of a variety of devices to store energy. For example, in some embodiments, the energy storage devices 140 and/or 240 can include batteries, capacitors, or the like.

In various embodiments, the interface 150 and/or 250 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.11n, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1x RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
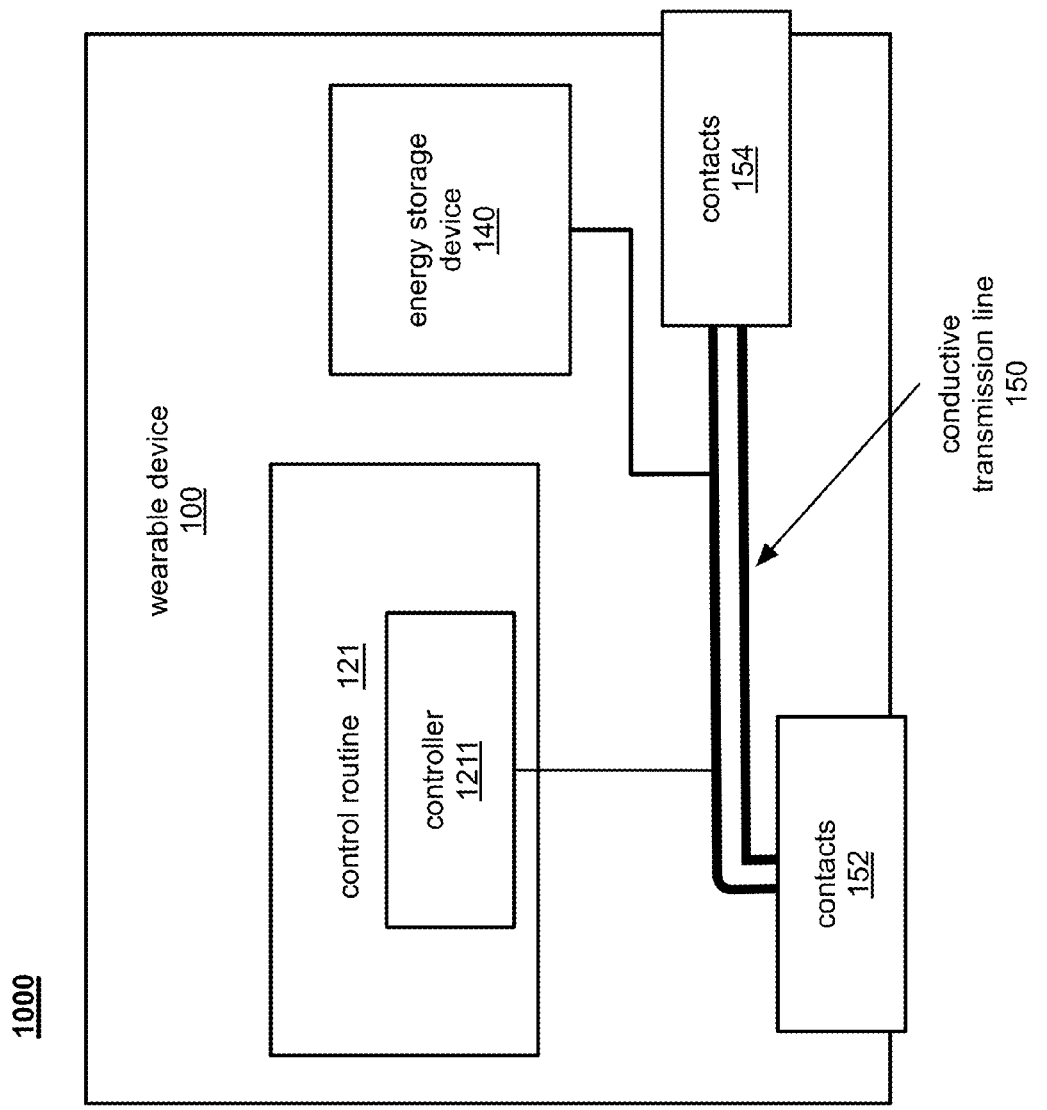
FIGS. 2-3 illustrate examples of portions of the wearable device and system of FIG. 1.
Figure 3:
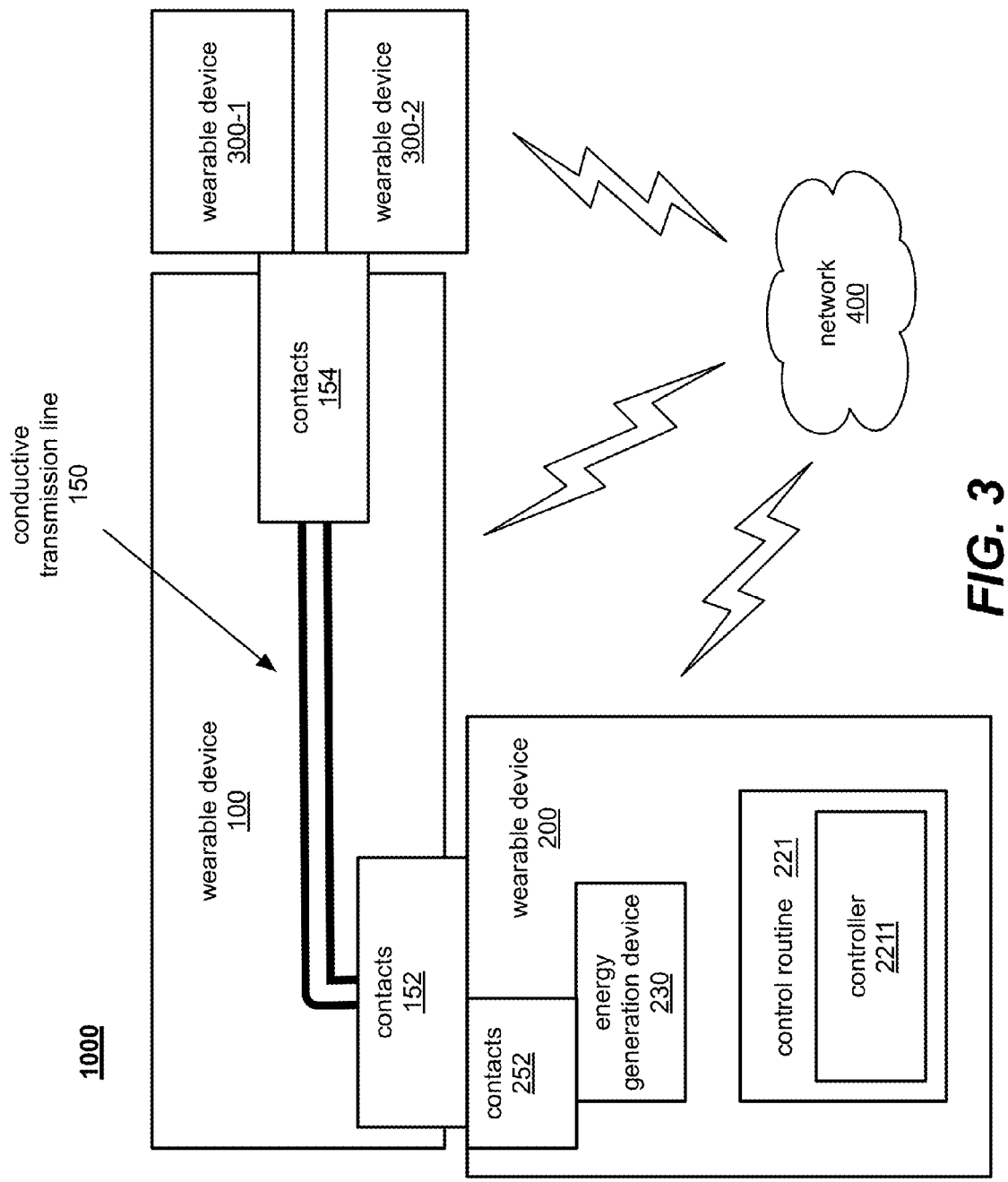

FIGS. 2-3 are bock diagrams illustrating example implementations of the system 1000 of FIG. 1. In general, FIG. 2 illustrates the wearable device 100 configured to transmit power between two points on the wearable device while FIG. 3 illustrates the wearable device 100 configured to transmit power from the wearable device 200 to one or more other wearable devices 300-a. In various embodiments, the control routines 121 and/or 221 may include one or more of an operating system, device drivers and/or application-level routines (e.g., so-called "software suites" provided on disc media, "applets" obtained from a remote server, or the like). Where an operating system is included, the operating system may be any of a variety of available operating systems appropriate for whatever corresponding ones of the processor component 110 and/or 210. Where one or more device drivers are included, those device drivers may provide support for any of a variety of other components, whether hardware or software components, of the wearable device 100-1 and/or the computing device 200.

Turning more specifically to FIG. 2, the wearable device 100 is configured to transmit power through the conductive transmission line 150 between the contacts 152 and the contacts 154. As depicted, the wearable device 100 includes the conductive transmission line 150, which is electrically coupled to contacts 152 and 154. The contacts 152 can be disposed on a first point of the wearable device 100 while the contacts 154 can be disposed on a second point of the wearable device 100. The contacts 152 and 154 are configured to electrically couple a power source (e.g., the energy generation device 230 shown in FIG. 1) to a device that needs power, such as, for example, a device to be charged and/or powered.

With some examples, the contacts can be incorporated into removable clothing. Additionally, the contacts may be releasable connected, such as, for example by magnets, hook-and-loop enclosures, snaps, or the like. For example, the wearable device 100 may be incorporated into pants (refer to FIGS. 4A-4B). As another example, the wearable device 100 can be incorporated into socks, under clothing, a belt, a shirt, a jacket, a hat, a sweater, a scarf, or the like.

In some examples, the wearable device 100 can include the energy storage device 140. The energy storage device 140 can be configured in electrical communication with the conductive transmission line 150, such that the energy storage device 140 can store energy received from an attached wearable device (e.g., the wearable device 200, or the like). Said differently, the energy storage device 140 can be configured to store energy received from the contacts 152 such that during periods where the contacts 152 are not connected to a power source, the wearable device 100 may be powered and/or may provide power to the contacts 154.

Furthermore, the wearable device 100 may include the processor component 110, the storage 120, and the control routine 121. In executing the control routine 121, the processor component 110 may provide feedback regarding the connection between contacts 152 and 154. For example, the control routine 121 can include a controller 1211. The controller 1211 can determine whether the set of contacts 152 are electrically coupled to a wearable device (e.g., the wearable device 200, or the like).

Additionally, the controller 1211 can provide an indication that the set of contacts 152 are electrically coupled to the wearable device based on the determination that the set of contacts are electrically coupled to the wearable device; or provide an indication that the set of contacts are not electrically coupled to the wearable device based on the determination that the set of contacts are not electrically coupled to the wearable device.

With some embodiments, the wearable computing device 100 may include additional components (e.g., a speaker, an LED, a display, or the like) to provide feedback directed to a user. The feedback to include an indication of whether the contacts 152 are connected, when connection between the contacts 152 and a wearable device are broken, the status of the energy storage device 140, or the like.

Turning more specifically to FIG. 3, the wearable device 100 is configured to transmit power through the conductive transmission line 150 between the contacts 152 and the contacts 154. As depicted, the wearable device 100 includes the conductive transmission line 150, which is electrically coupled to contacts 152 and 154. The contacts 152 are in electrical communication with the wearable device 200. More specifically, the energy generation device 230 is connected to the conductive transmission line 150 through the contacts 152 and contacts 252. Additionally, the contacts 154 can be in electrical communication with one or more additional wearable devices and/or components to receive power or be charged.

In general, the wearable device 200 is configured to generate energy (e.g., via the energy generation component 230, or the like) and communicate the energy to one or more of the wearable devices 300-*a*, where "a" is a positive integer, through the wearable device 100. It is important to note that the system 1000 can be configured to communicate power between the wearable device 200 and any number of wearable devices 300-*a*. However, for purposes of clarity, only the wearable devices 300-1 and 300-2 are depicted and referenced below and as such, these examples are not intended to be limiting.

Furthermore, with some implementations, the wearable device 100, the wearable device 200, the wearable device 300-1, and/or the wearable device 300-2 can be in communication via the network 400. As described above, the wearable devices can be implemented with interfaces (e.g., the interface 150, the interface 250, or the like) to facilitate communication between devices. It is important to note, that the network 400 can be either wireless or wired. However, for purposes of clarity, the network 400 is depicted as wireless. With various implementations, the network 400 can include an intranet, a local area network, a wide area network, the Internet, the Internet of Things, or the like.

As depicted above, the wearable device 200 may include the processor component 210, the storage 220, and the control routine 221. In executing the control routine 221, the processor component 210 may provide feedback regarding the connection between contacts 252 and 254 and/or manage the connection between the energy generation component 230 and the wearable devices 300-1 and/or 300-2. The control routine 221 can include a controller 2211. The controller 2211 can determine whether the set of contacts 152 and 252 are electrically coupled.

For example, the controller 2211 can provide an indication that the set of contacts 152 and 252 are electrically coupled based on the determination that the set of contacts are electrically coupled; or provide an indication that the set of contacts 152 and 252 are not electrically coupled based on the determination that the set of contacts are not electrically coupled to the wearable device 200.

With some embodiments, the wearable computing device 200 may include additional components (e.g., a speaker, an LED, a display, or the like) to provide feedback directed to a user. The feedback to include an indication of whether the contacts 152 and 252 are connected, when connection between the contacts 152 and 252 are broken, the status of the energy generation component 230, the status of the energy storage device 240, or the like.

In some embodiments, the controller 2211 can receive an indication (e.g., via the network 400) from one or more of the wearable devices 300-1 and/or 300-2, the indication to include a notice that the wearable devices 300-1 and/or 300-2 require power from the wearable device 200. The controller 2211 can output power from the energy generation device 230 to the wearable devices 300-1 and/or 300-2 through the conductive transmission line 150 based on receiving the indication from the wearable devices 300-1 and/or 300-2.

FIGS. 4A-4B, 5A-5B, 6A-6B, and 7-8 are illustrations of example implementations of the wearable devices 100 and/or 200. In particular, these figures depict examples of the contacts 152, the conductive transmission line 150, and the contacts 252. Turning more specifically to FIGS. 4A-4B, an example of the wearable device 100 is depicted. In this example, the wearable device 100 is implemented as removable clothing, and particularly, pants. However, this example is not intended to be limiting. With some implementations, the contacts 152 can comprise an array of conductive elements 152-*a*. For example, the conductive elements 152-1 and 152-2 are highlighted in the figures. The contacts 152 can include the array of conductive elements 152-*a* to provide multiple connection points for the contacts 252. The contacts can be electrically coupled to the conductive transmission line 150, which as depicted is implemented in a seam of the pants.

With some examples, the contacts 152 can form rows (e.g., refer to FIG. 4A) that extend around a portion of the wearable device 100 (e.g., the pants cuff, or the like). With some examples, the contacts 152 can extend around a circumference (e.g., refer to FIG. 4B) of a portion of the wearable device 100 (e.g., the pants cuff, or the like).

Figures 5A, 5B:
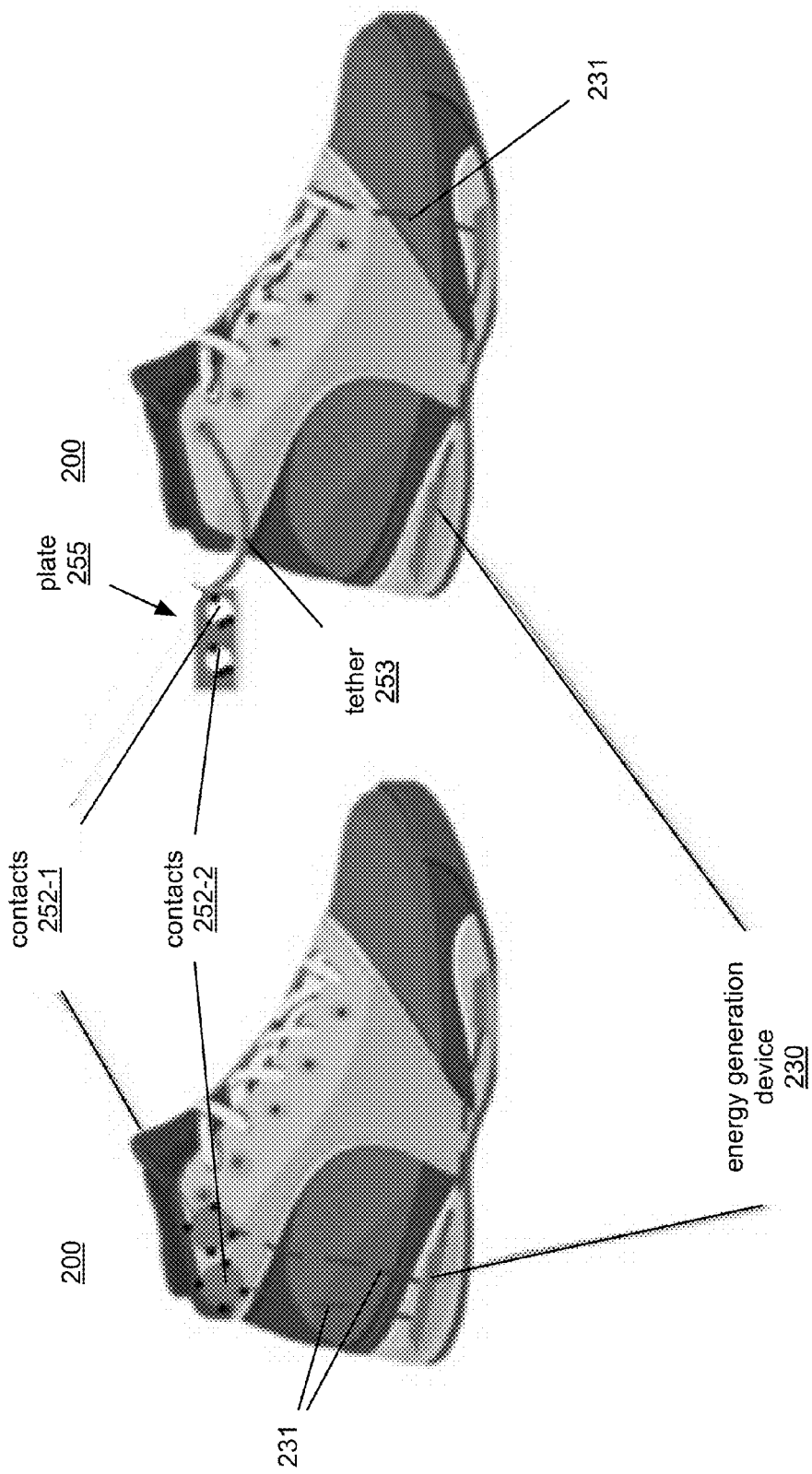

Turning more specifically to FIGS. 5A-5B, an example of the wearable device 200 is depicted. In this example, the wearable device 200 is implemented as removable clothing, and particularly, shoes. However, this example is not intended to be limiting. With some implementations, the contacts 252 can comprise conductive elements 252-1 and 252-2. The conductive elements 252-1 and 252-2 can be coupled to the energy generation device 230 via conductive paths 231 (e.g., conductive wire, conductive thread, conductive paint, conductive ribbon, or the like).

With some examples, the contacts 252 can be affixed to the surface of the wearable device 200 (e.g., refer to FIG. 5A). With some examples, the contacts 252 can be affixed to the wearable device 200 via a tether 253 (e.g., refer to FIG. 5A). In some examples, the tether 253 can be a shoe lace, an extension of a shoe lace, a flexible material attached to the wearable device and a plate 255 holding the contacts.

Figure 6B:
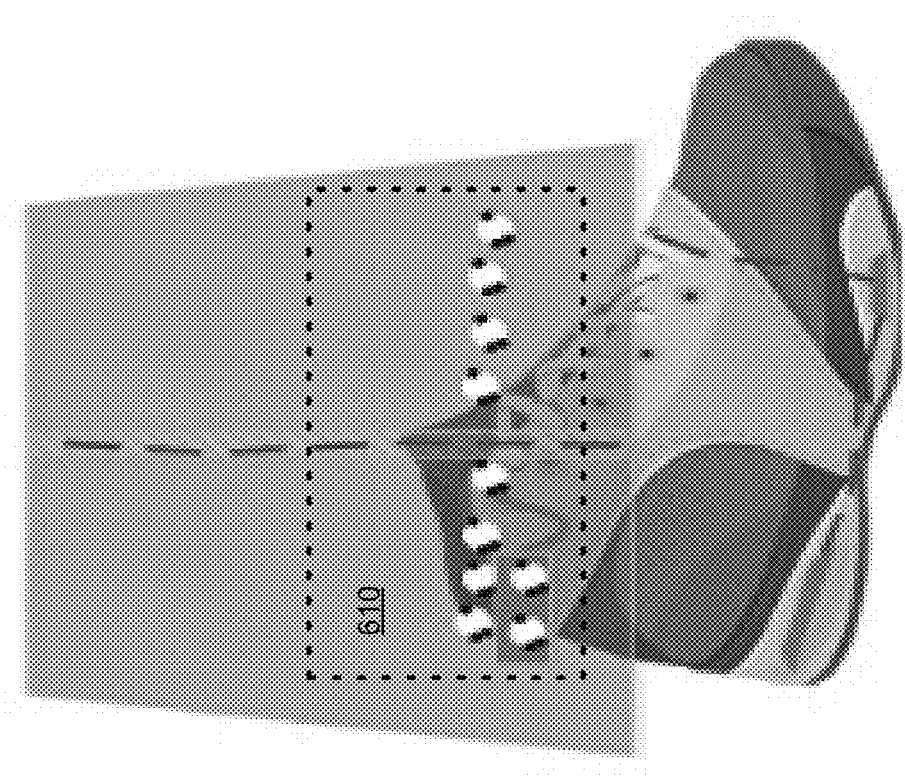
Figure 6A:
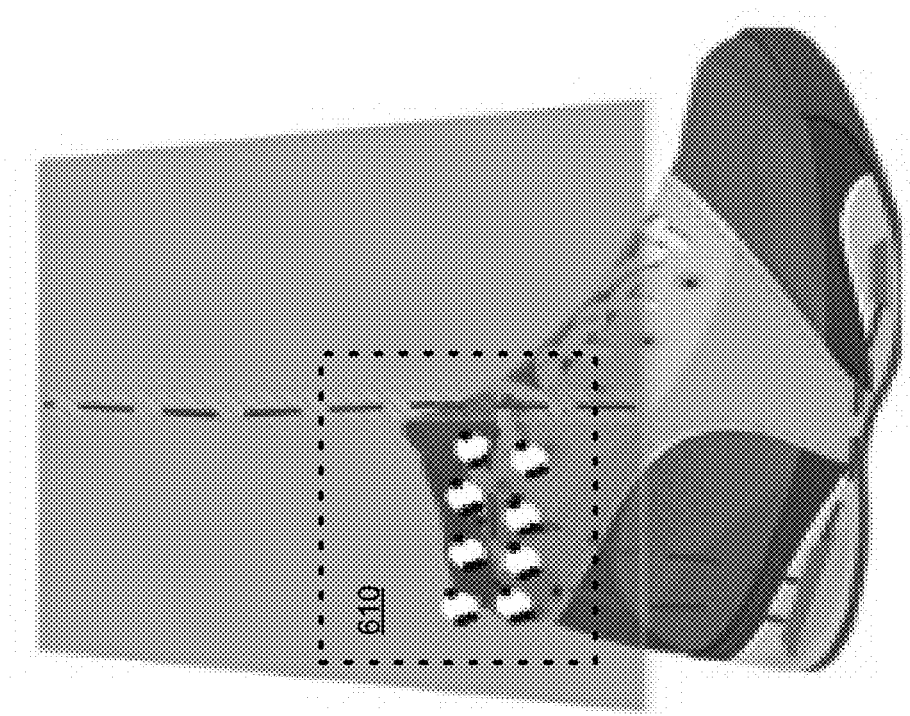

Turning more specifically to FIGS. 6A-6B, an example of the wearable device 100 connected to the wearable device 200 is depicted. In this example, the wearable device 100 is implemented as removable clothing, and particularly pants while the wearable device 200 is implemented as removable clothing, and particularly, shoes. With some examples, the contacts 152 and 252 can be removably affixed to each other. For example, the contacts 152 and/or 252 can be implemented with a releasable connector 610. In some examples, the releasable connector can be magnetic. For example, the plate 255 can be magnetic; magnets can be implanted in the wearable device adjacent to the contacts 152 and/or 252; or the like. In some examples, the releasable connector can include hook-and-loop enclosure. For example, the plate 255 can include hook-and-loop features, hook-and-loop features can be implanted in the wearable device adjacent to the contacts 152 and/or 252. In some examples, the releasable connector can be snaps. For example, the contacts 152 and 252 can be implemented as snaps (refer to FIG. 7).

Figure 7:
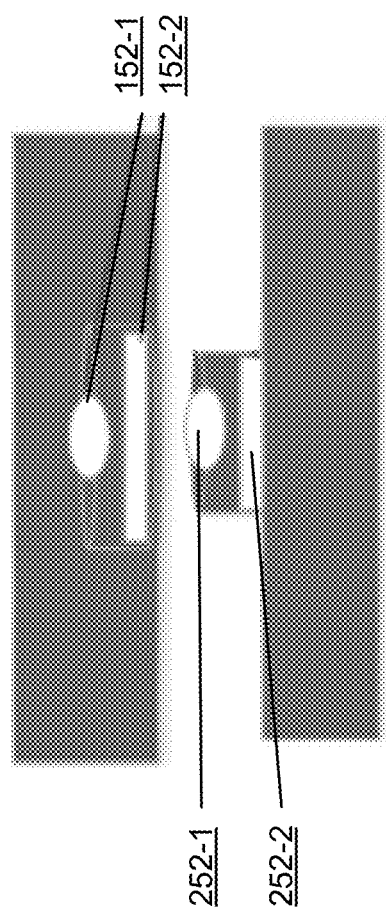

Turning more specifically to FIG. 7, an example of the contacts 152 and 252 is depicted. With some examples, the contacts 152 and 252 can be configured as snaps. For example, the contacts 152 can be a first portion of a snap with the contacts 152-1 and 152-2 separate conductive elements within the first part of the snap while the contacts 252 can be a corresponding second portion of the snap with the contacts 252-1 and 252-2 separate conductive elements within the second portion of the snap. As depicted, the contacts 152-1 and 252-1 are configured to be in electrical communication when the snap is closed. Similarly, the contacts 152-2 and 252-2 are configured to be in electrical communication when the snap is closed.

Figure 8:
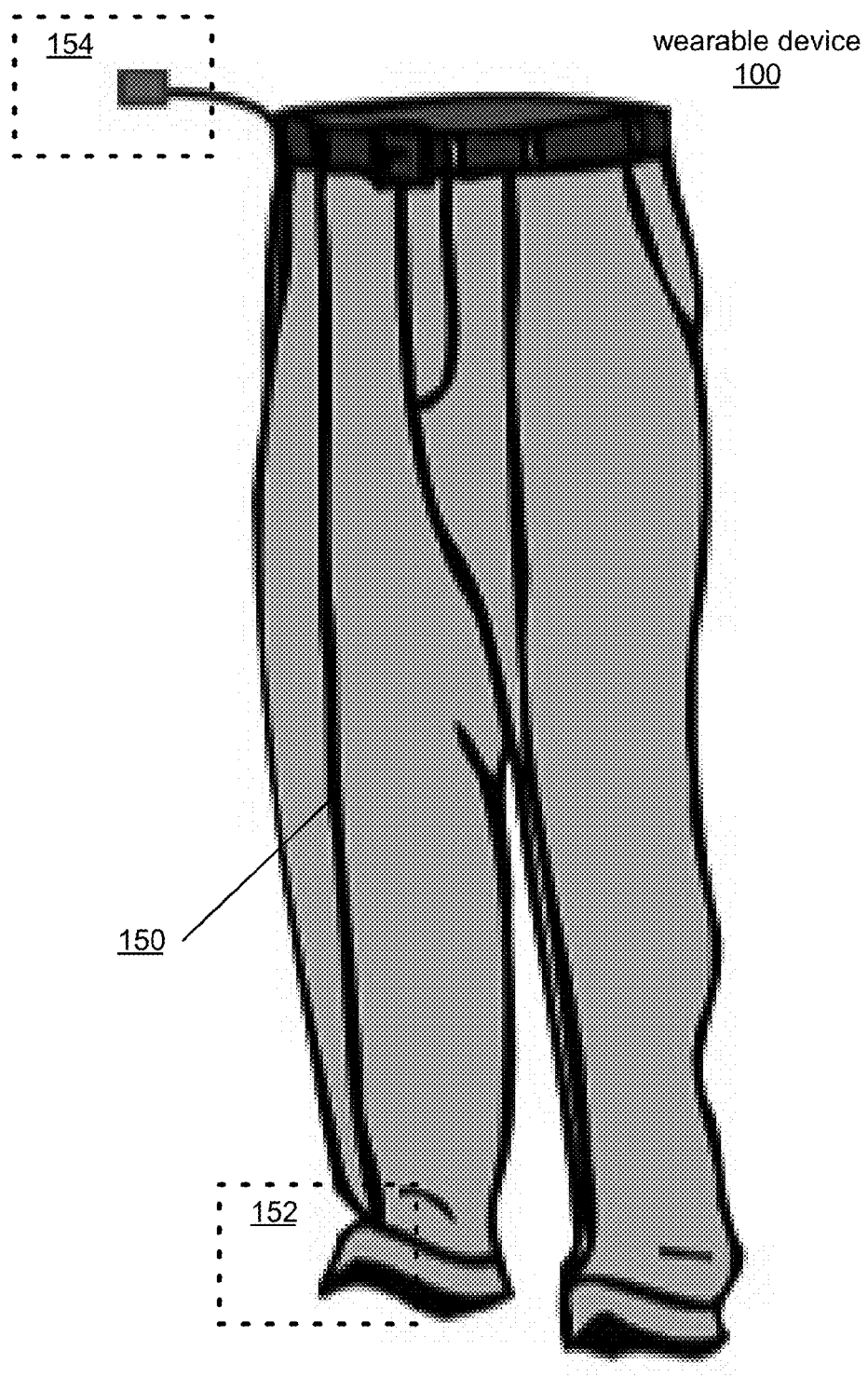

Turning more specifically to FIG. 8, an example of the wearable device 100 is depicted. In this example, the wearable device 100 is implemented as removable clothing, and particularly, pants. As depicted, the wearable device 100 include contacts 152 near the cuff of the pants with the conductive transmission line 150 running up the seam of the wearable device 100 to electrically connect the contacts 152 to the contacts 154. In some examples, the contacts 154 can be contacts similar to the contacts 152 described above. In some examples, the contacts 154 can be various ports configured to connect to other devices. For example, the contacts 154 can be implemented as a male port (e.g., USB, or the like). As another example, the contacts can be implemented as a female plug (e.g., thunderbolt, micro-USB, or the like). In some examples, the contacts 154 can be stowed (e.g., in a pocket, or the like) in a portion of the wearable device 100.

As noted, the examples provided herein are not intended to be limiting. For example, the wearable devices 100 and 200 may be implemented in different types of removable clothing than shown. For example, the wearable device 200 can be implemented as a jacket (e.g., with a solar panel, or the like) while the wearable device 100 can be implemented as a belt. These are just a few of the possible implementations. Providing an exhaustive list is not feasible. However, the examples have been provided for purposes of clarity and explanation.

Figure 9:
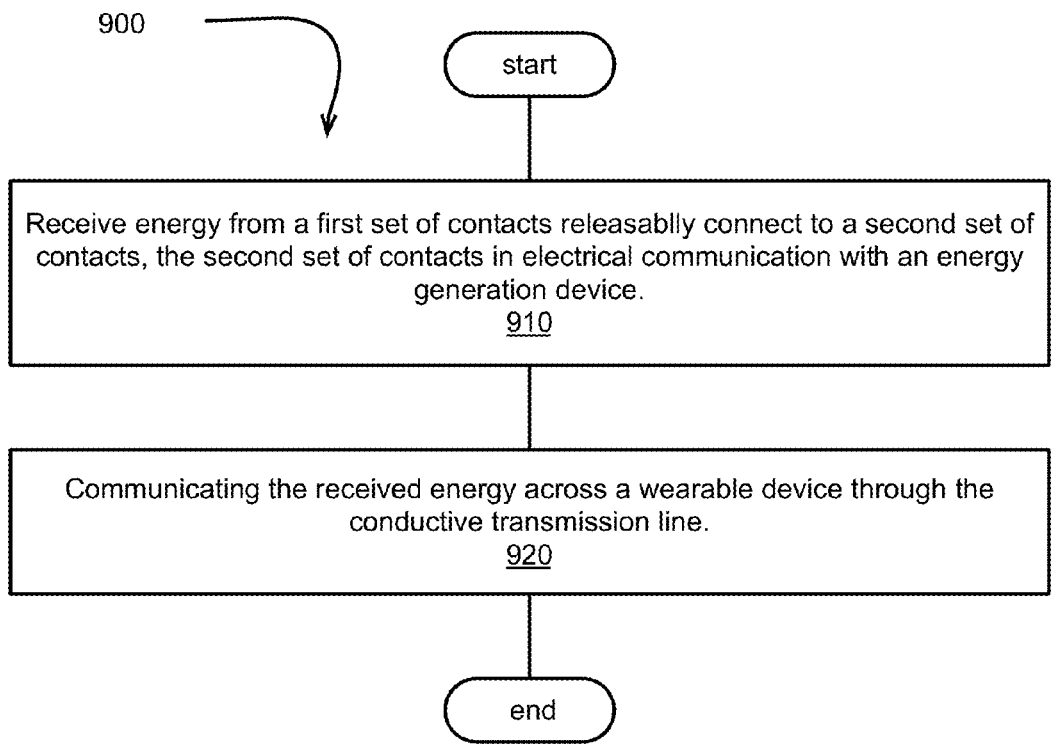
FIG. 9 illustrates an example of a logic flow according to at least one embodiment of the present disclosure.

FIG. 9 illustrates an example embodiment of a logic flow 900 that may be implemented by the wearable devices 100 and/or 200. The illustrated logic flow may be representative of some or all of the operations executed by one or more embodiments described herein. More specifically, the logic flows may illustrate operations performed by the processor components 110 and/or the 210 in executing at least the control routines 121 and/or 221. Although the logic flows are described with reference to FIGS. 1-8, examples are not limited in this context.

The logic flow 900 may begin at block 910. At block 910, energy from an energy generation device is communicated to a conductive transmission line (e.g., through a first set of contacts and a second set of contacts being releasably connected). 152 For example, the contacts 152 can be connected to the contacts 252 such that energy (e.g., electrical power) from the energy generation device 230 is communicated to the conductive transmission line 150.

Continuing to block 920, the received energy is communicated across a wearable device through the conductive transmission line. For example, energy received from the wearable device 200 (e.g., from the energy generation device 230, from the energy storage device 240, or the like) can be communicated across the wearable device 100, via the conductive transmission line 150.

Figure 10:
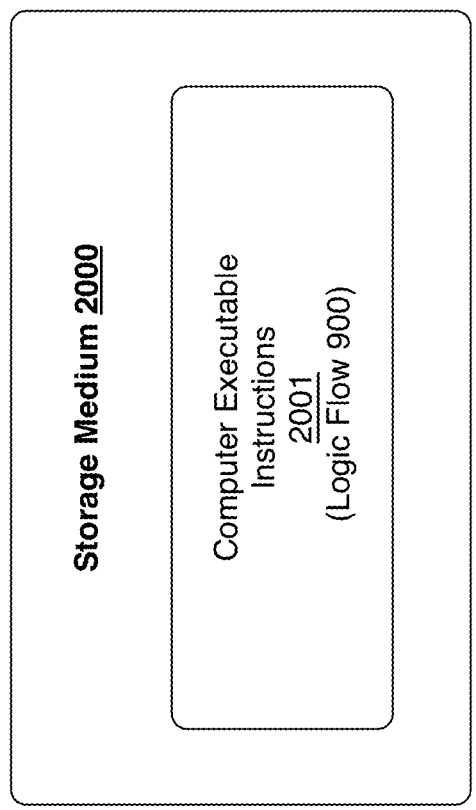
FIG. 10 illustrates a storage medium according to at least one embodiment of the present disclosure.

FIG. 10 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions 2001, such as instructions to implement the logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
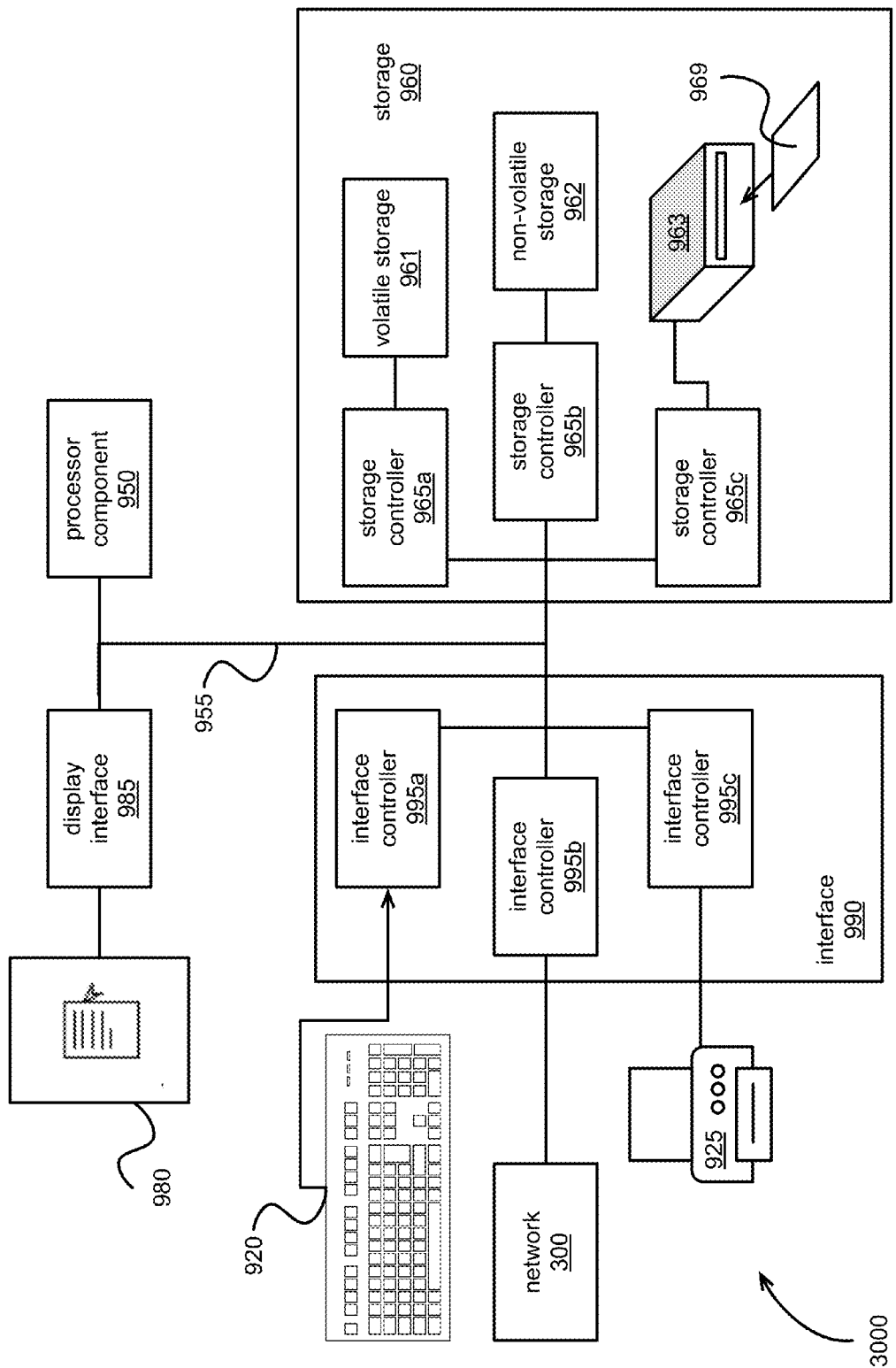
FIG. 11 illustrates a processing architecture according to at least one embodiment of the present disclosure.

FIG. 11 illustrates an embodiment of an exemplary processing architecture 3000 suitable for implementing various embodiments as previously described. More specifically, the processing architecture 3000 (or variants thereof) may be implemented as part of the wearable computing devices 100-1, 100-2, 100-3, and/or the system 1000.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 may include one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor component 110 and/or 210) may include any of a wide variety of commercially available processors, employing any of a wide variety of technologies and implemented with one or more cores physically combined in any of a number of ways.

As previously discussed, the storage 960 (corresponding to the storage 130 and/or 230) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to the interface 160 and/or 260) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 300 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, sounds, laser printers, inkjet printers, mechanical robots, milling machines, etc.

Where a computing device is communicatively coupled to (or perhaps, actually incorporates) a display (e.g., the depicted example display 980, corresponding to the display 150 and/or 250), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus to transmit power from a wearable computing device, the apparatus comprising: a conductive transmission line to communicate electrical energy from a first position to a second position; and a set of contacts in electrical communication with the conductive transmission line at the first position, the set of contacts to electrically couple a wearable device to the conductive transmission line, the wearable device including a power source to provide electrical energy to the second position through the set of contacts and the conductive transmission line.

Example 2

The apparatus of example 1, the set of contacts comprising a releasable connector to couple the set of contacts to the conductive transmission line.

Example 3

The apparatus of example 2, wherein the releasable connector comprises magnets, hook-and-loop closures, or snaps.

Example 4

The apparatus of example 1, comprising an energy storage device in electrical communication with the conductive transmission line, the energy storage device to store energy received from the wearable device.

Example 5

The apparatus of example 4, the energy storage device comprising a capacitor or a rechargeable battery.

Example 6

The apparatus of example 1, comprising a controller coupled to the conductive transmission line, the controller to: determine whether the set of contacts are electrically coupled to the wearable device; and provide an indication that the set of contacts are electrically coupled to the wearable device based on the determination that the set of contacts are electrically coupled to the wearable device; or provide an indication that the set of contacts are not electrically coupled to the wearable device based on the determination that the set of contacts are not electrically coupled to the wearable device.

Example 7

The apparatus of example 6, comprising a speaker, the indication to include a control signal to cause the speaker to emit a signal based on the indication.

Example 8

The apparatus of example 6, comprising an LED, the indication to include a control signal to cause the LED to emit a signal based on the indication.

Example 9

The apparatus of any one of examples 1 to 8, the conductive transmission line comprising conductive thread, conductive paint, or a body coupled energy transmission system.

Example 10

The apparatus of any one of examples 1 to 8, wherein the apparatus is implemented as a wearable device.

Example 11

The apparatus of example 10, wherein the wearable device is removable clothing.

Example 12

The apparatus of example 11, wherein the wearable device comprises: socks, under clothing, pants, a belt, a shirt, a sweater, a jacket, a hat, a scarf, eye glasses, a hearing aid, or a wristband.

Example 13

A system for communicating electrical energy across a wearable device, the system comprising: an energy generation device; and a first set of contacts in electrical communication with the energy generation component, the first set of contacts to releasable connect to a second set of contacts, the second set of contacts in electrical communication with a conductive transmission line, the conductive transmission line to communicate electrical energy from the energy generation device to a third set of contacts.

Example 14

The system of example 13, comprising a releasable connector to couple the first set of contacts to the second set of contacts.

Example 15

The system of example 14, wherein the releasable connector comprises magnets, hook-and-loop closures, or snaps.

Example 16

The system of example 13, comprising an energy storage device in electrical communication with the energy generation device, the energy storage device to store energy received from the energy generation device.

Example 17

The system of example 16, the energy storage device comprising a capacitor or a rechargeable battery.

Example 18

The system of example 13, comprising a controller coupled to the first set of contacts, the controller to: determine whether the first set of contacts are electrically coupled to the second set of contacts; and provide an indication that the first set of contacts are electrically coupled to the second set of contacts based on the determination that the first set of contacts are electrically coupled to the second set of contacts; or provide an indication that the first set of contacts are not electrically coupled to the second set of contacts based on the determination that the first set of contacts are not electrically coupled to the second set of contacts.

Example 19

The system of example 18, comprising a speaker, the indication to include a control signal to cause the speaker to emit a signal based on the indication.

Example 20

The system of example 18, comprising an LED, the indication to include a control signal to cause the LED to emit a signal based on the indication.

Example 21

The system of example 13, wherein the energy generation component is implemented in a first wearable device.

Example 22

The system of example 21, wherein the conductive transmission line is implemented in a second wearable device.

Example 23

The system of example 22, wherein the first wearable device and the second wearable device are removable clothing.

Example 24

The system of example 23, wherein the first wearable device comprises: socks, under clothing, pants, a belt, a shirt, a sweater, a jacket, a hat, or a scarf.

Example 25

The system of example 23, wherein the second wearable device comprises: socks, under clothing, pants, a belt, a shirt, a sweater, a jacket, a hat, or a scarf.

Example 26

The system of any one of examples 13 to 25, the conductive transmission line comprising conductive thread, conductive paint, or a body coupled energy transmission system.

Example 27

The system of example 23, comprising a network interface to receive an indication from a third wearable device, the indication to include a request to receive power from the energy generation component.

Example 28

A method to comprising: receiving energy from a first set of contacts releasably connect to a second set of contacts, the second set of contacts in electrical communication with an energy generation device; and communicating the received energy across a wearable device through the conductive transmission line.

Example 29

The method of example 28, wherein the releasable connector comprises magnets, hook-and-loop closures, or snaps.

Example 30

The method of example 28, comprising: determining whether the first set of contacts are electrically coupled to the second set of contacts; and providing an indication that the first set of contacts are electrically coupled to the second set of contacts based on the determination that the first set of contacts are electrically coupled to the second set of contacts; or providing an indication that the first set of contacts are not electrically coupled to the second set of contacts based on the determination that the first set of contacts are not electrically coupled to the second set of contacts.

Example 31

The method of example 30, the indication to include a control signal to cause a speaker to emit a signal based on the indication.

Example 32

The method of example 30, the indication to include a control signal to cause an LED to emit a signal based on the indication.

Example 33

The method of example 28, wherein the energy generation component is implemented in a first wearable device.

Example 34

The method of example 33, wherein the conductive transmission line is implemented in a second wearable device.

Example 35

The method of example 34, wherein the first wearable device and the second wearable device are removable clothing.

Example 36

The method of example 35, wherein the first wearable device comprises: socks, under clothing, pants, a belt, a shirt, a sweater, a jacket, a hat, or a scarf.

Example 37

The method of example 35, wherein the second wearable device comprises: socks, under clothing, pants, a belt, a shirt, a sweater, a jacket, a hat, or a scarf.

Example 38

The method of any one of examples 28 to 37, the conductive transmission line comprising conductive thread, conductive paint, or a body coupled energy transmission system.

Example 39

The method of example 28, comprising receiving an indication from a third wearable device via a network interface, the indication to include a request to receive power from the energy generation component.

Example 40

At least one machine readable medium comprising a plurality of instructions that in response to being executed on a wearable device causes the wearable computing device to perform the method of any of examples 28 to 39.

Example 41

An apparatus for a wearable computing device, the apparatus comprising means for performing the method of any one of examples 28 to 39.

What is claimed is:

1. An apparatus to transmit power from a second wearable device to a first wearable device, the apparatus comprising:
    a first article of clothing comprising the first wearable device, the first wearable device comprising:
        a conductive transmission line to communicate electrical energy from a first position to a second position within the first article of clothing, and
        a plurality of first wearable device contacts, at least one first contact of the plurality of first wearable device contacts in electrical communication with the conductive transmission line at the first position, the at least one first contact of the plurality of first wearable device contacts to electrically couple the first wearable device to the at least one second wearable device contact of the second wearable device arranged in a second article of clothing, the second wearable device comprising a power source to provide electrical energy to the second position through the conductive transmission line.

2. The apparatus of claim 1, at least a portion of the plurality of first wearable device contacts comprising a releasable connector to releasably couple the at least a portion of the plurality of first wearable device contacts to the at least one second wearable device contact.

3. The apparatus of claim 2, wherein the releasable connector comprises magnets, hook-and-loop closures, or snaps.

4. The apparatus of claim 1, comprising an energy storage device in electrical communication with the conductive transmission line, the energy storage device to store energy received from the second wearable device.

5. The apparatus of claim 4, the energy storage device comprising a capacitor or a rechargeable battery.

6. The apparatus of claim 1, comprising a controller coupled to the conductive transmission line, the controller to:
    provide an indication that the at least one first contact of the plurality of first wearable device contacts are electrically coupled to the second wearable device.

7. The apparatus of claim 6, comprising a speaker, the indication to include a control signal to cause the speaker to emit a signal based on the indication.

8. The apparatus of claim 6, comprising an LED, the indication to include a control signal to cause the LED to emit a signal based on the indication.

9. The apparatus of claim 1, the conductive transmission line comprising conductive thread, conductive paint, or a body coupled energy transmission system.

10. The apparatus of claim 1, wherein the first article of clothing comprises pants and the second article of clothing comprises shoes.

11. The apparatus of claim 1, wherein the first article of clothing comprises: socks, under clothing, pants, a belt, a shirt, a sweater, a jacket, a hat, a scarf, eye glasses, a hearing aid, or a wristband.

12. A system for communicating electrical energy across a wearable device, the system comprising:
    an energy generation device; and
    a first set of contacts arranged in a first wearable device and in electrical communication with the energy generation device, the first set of contacts to releasable connect to a second set of contacts arranged in a second wearable device, the second set of contacts in electrical communication with a conductive transmission line, the conductive transmission line to communicate electrical energy from the energy generation device to a third set of contacts.

13. The system of claim 12, comprising a releasable connector to couple the first set of contacts to the second set of contacts.

14. The system of claim 13, wherein the releasable connector comprises magnets, hook-and-loop closures, or snaps.

15. The system of claim 12, comprising an energy storage device in electrical communication with the energy generation device, the energy storage device to store energy received from the energy generation device.

16. The system of claim 15, the energy storage device comprising a capacitor or a rechargeable battery.

17. The system of claim 12, comprising a controller coupled to the first set of contacts, the controller to:
    determine whether the first set of contacts are electrically coupled to the second set of contacts; and
    provide an indication that the first set of contacts are electrically coupled to the second set of contacts based on the determination that the first set of contacts are electrically coupled to the second set of contacts; or
    provide an indication that the first set of contacts are not electrically coupled to the second set of contacts based on the determination that the first set of contacts are not electrically coupled to the second set of contacts.

18. The system of claim 17, comprising a speaker, the indication to include a control signal to cause the speaker to emit a signal based on the indication.

19. The system of claim 17, comprising an LED, the indication to include a control signal to cause the LED to emit a signal based on the indication.

20. The system of claim 12, wherein the energy generation device is arranged in the first wearable device and the conductive transmission line is arranged in the second wearable device.

21. At least one non-transitory machine readable medium comprising a plurality of instructions that in response to being executed on a second wearable device causes the second wearable device to:
    receive energy from a first set of contacts arranged in a first wearable device and in a releasable connection with a second set of contacts arranged in the second wearable device, the second set of contacts in electrical communication with an energy generation device of the first wearable device via the releasable connection; and
    communicate the received energy across the second wearable device from a first position to a second position through a conductive transmission line.

22. The at least one non-transitory machine readable medium of claim 21, the plurality of instructions cause the wearable computing device to:

determine whether the first set of contacts are electrically coupled to the second set of contacts; and provide an indication that the first set of contacts are electrically coupled to the second set of contacts based on the determination that the first set of contacts are electrically coupled to the second set of contacts; or provide an indication that the first set of contacts are not electrically coupled to the second set of contacts based on the determination that the first set of contacts are not electrically coupled to the second set of contacts.

23. The at least one non-transitory machine readable medium of claim 21, the plurality of instructions to cause the second wearable computing device to receive an indication from a third wearable device via a network interface, the indication to include a request to receive power from the energy generation component.

24. The apparatus of claim 1, the plurality of first wearable device contacts comprising at least one second contact in electrical communication with the conductive transmission line at the second position, the at least one second contact of the plurality of first wearable device contacts to electrically couple the second wearable device to a third wearable device.

\* \* \* \* \*